Nov. 22, 1955 P. H. PONS 2,724,459
TRACK BRAKE OF THE JAW TYPE FOR RAILROAD CARS
Filed Feb. 7, 1951 2 Sheets-Sheet 1

Inventor
Paul Henri Pons
by Michael S. Striker

Nov. 22, 1955　　　　P. H. PONS　　　　2,724,459
TRACK BRAKE OF THE JAW TYPE FOR RAILROAD CARS
Filed Feb. 7, 1951　　　　　　　　　　　　2 Sheets-Sheet 2

Inventor
Paul Henri Pons

United States Patent Office 2,724,459
Patented Nov. 22, 1955

2,724,459

TRACK BRAKE OF THE JAW TYPE FOR RAILROAD CARS

Paul Henri Pons, Chantilly, France, assignor to Etablissements Saxby, Paris, France Application February 7, 1951, Serial No. 209,714

Claims priority, application France March 17, 1950

10 Claims. (Cl. 188—62)

My invention has for its object a track brake of the jaw type for railroad cars, wherein the clamping action exerted on the surfaces of the wheel tires is substantially proportional to the weight carried by said tires.

According to my invention, the track brake includes a stationary jaw and a movable jaw carried by a rocking lever, the stationary and movable jaws being located each to one side of one of the rails and near the latter, the rocking axis of the lever being substantially parallel to the rail and the said lever being provided at one end with a section submitted at least partly to the pressure transmitted by the wheels running over the rail that is not located between the brake jaws. The lever of the movable jaw may be advantageously bent.

According to another object of the invention, the free end of the lever carrying the movable jaw may lie in contact with a control bar over a sloping surface of the latter, said bar being provided with means controlling its longitudinal movements whereby it is possible to make the lever rock round its axis in accordance with the position assumed by the sloping surface of said bar.

The upper portion of the control bar may be located near the rail that is not located between the brake jaws so as to be submitted directly to the pressure exerted by the wheels of the railroad car.

According to a modification of my invention, this upper portion of the control rod may be fitted underneath the said rail that is not located between the brake jaws and in contact with said rail.

According to a further embodiment, the control bar may carry at least one transverse stay the ends of which are in contact with both rails.

According to a still further embodiment, the control rod may carry at least one transverse stay the ends of which are rigid with shoes on which the car wheels exert their pressure.

Lastly, the terminal section of the lever, that is submitted at least to a part of the pressure transmitted by the wheels, may be provided with a roller.

I will now disclose my invention with further detail, reference being made to preferred embodiments given by way of exemplification and illustrated in accompanying drawings, wherein.

Figure 1:
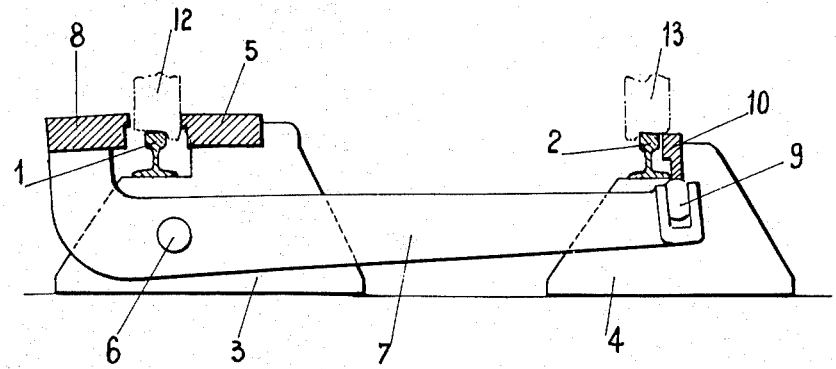
Fig. 1 is a cross-section of a track provided with a brake according to the invention, said brake being in its released position.
Figure 3:
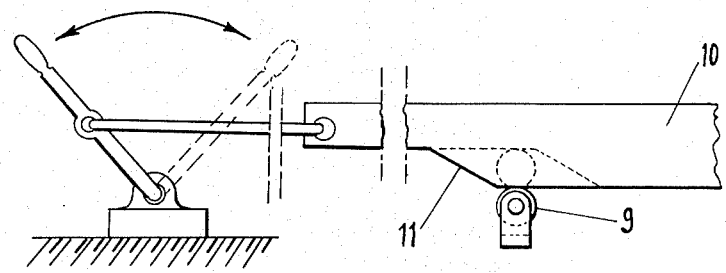
Fig. 3 is a side view of a section of the control bar.

Turning to Fig. 1, the rails 1 and 2 are mounted on carriers 3 and 4. The carrier 3 is provided with a stationary jaw 5 located on the inside of one track rail. A spindle 6 is provided, furthermore, on the carrier 3 to pivotally carry the lever 7, that is adapted to rock in a plane perpendicular to the axis of the track. The lever 7 is bent and carries the movable jaw 8 at one end and a roller 9 at its other end. The roller 9 bears against the lower surface of a control bar 10 adapted to move vertically while remaining parallel with the rail 2. The upper surface of the bar 10 is substantially flush with the running surface of the rail 2 while its lower surface is provided with a sloping part 11, as shown in Fig. 3. The longitudinal movement of the bar controlling the pivotal movement of the lever is obtained through any suitable means such as that shown in Fig. 3.

The lever 7 is equilibrated in a manner such that the roller 9 may normally engage the lower part of the control bar 10 and may move up and down the slope 11.

Fig. 1 illustrates the brake when inoperative, the roller 9 assuming then with reference to the control bar 10 the position illustrated in dotted lines in Fig. 3, in which case the wheel 12 of the railroad car may pass freely between the jaws 5 and 8 of the brake that are in this case sufficiently spaced for this purpose.

Figure 2:
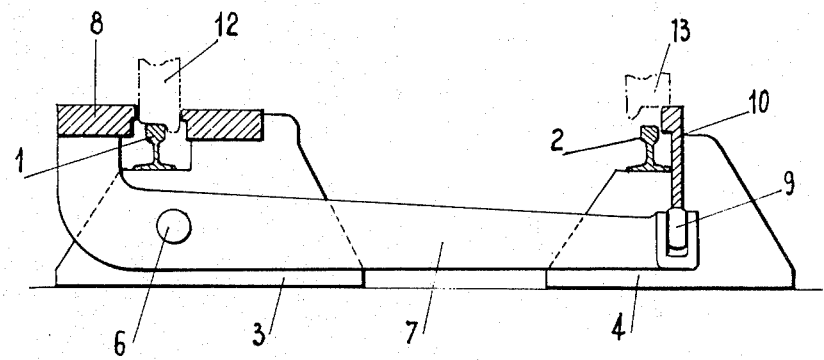
Fig. 2 is a cross-section similar to Fig. 1 and showing the same brake in its operative position.

Fig. 2 illustrates in contradistinction the track brake when operative, the roller 9 assuming with reference to the control bar 10 the position illustrated in solid lines in Fig. 3, said position being obtained through a shifting of said bar in parallelism with the rail 2, in order to make the roller 9 rise over the slope 11. During this movement of the bar 10, the movable jaw 8 is constrained to move nearer the stationary jaw 5, the spacing between the jaws being then less than the breadth of the tire of the wheel 12. At the same time, the jaw 8 is slightly raised which increases the area of its clamping surface adapted to engage the tire.

When a tire enters the brake, it urges slightly sideways the movable jaw and causes the lever 7 to pivot whereby the roller 9 on said lever has a tendency to raise the control bar 10. The upper surface of said bar in contact with the tire on the wheel 13 urges the latter upwardly and consequently said wheel 13 that is submitted to the weight of the car transmits to said bar 10 the thrust required for clamping the brake on the wheel 12.

Figure 4:
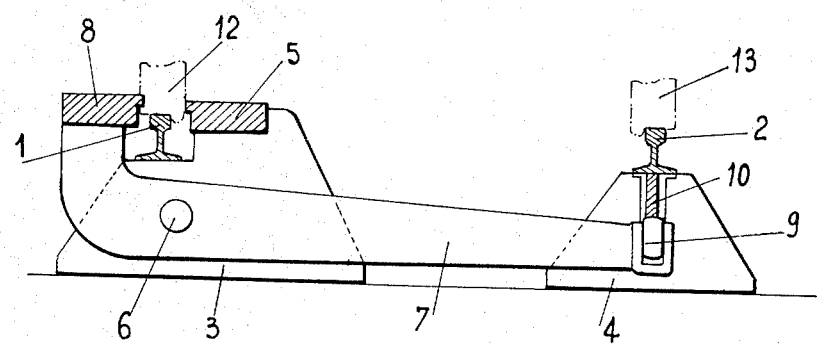
Fig. 4 is a cross-section similar to Fig. 1 of a modified embodiment of the arrangement according to the invention.

Fig. 4 illustrates a modification according to which the control bar 10 is located underneath the shoe of the rail 2 and in contacting relationship therewith. The rail 2 is laid so as to be capable of assuming slight vertical displacements with reference to its carrier 4. The control bar 10 is held through suitable guiding means, as shown in Fig. 3, in its position registering with the rail 2 while being capable of moving vertically in parallelism with said rail in order to provide for the release of the brake or to bring it into its operative position before any wheel has come into register with it. The shifting of the bar 10 produces a displacement of the roller 9 in the manner already disclosed with reference to Fig. 3 illustrating the preceding embodiment. When the brake is operative, the passage of a wheel 12 between the jaws 5 and 8 produces a raising movement of the system including the control bar 10 and the rail 2, the wheel 13 transmitting the thrust exerted by the weight of the car and acting in the opposed direction in order to lower the rail 2 and to provide for a fastening of the brake over the wheel 12.

Obviously my invention is by no means limited to the embodiment that has just been disclosed and that has been illustrated in accompanying drawings and various detail modifications may be brought to the said invention without unduly widening its scope as defined in accompanying claims.

What I claim is:

1. Apparatus for braking the movement of a vehicle having a pair of spaced wheels, said apparatus comprising, in combination, stationary support means; a braking member mounted on said support means for movement between a braking position in engagement with one of said vehicle wheels and a releasing position out of engagement with said one vehicle wheel; an actuating member mounted on said support means, at a distance from said braking member substantially equal to the distance between said spaced vehicle wheels, for movement in a predetermined direction from a first position where said actuating member is located in the path of the other of said vehicle wheels to be moved thereby toward a second position; and transmission means connecting said actuating member with said braking member for moving the latter into said braking position thereof when said other vehicle wheel moves said actuating member from said first toward said second position.

2. Apparatus for braking the movement of a vehicle having a pair of spaced wheels adapted to pass over a pair of spaced surface portions, said apparatus comprising, in combination, a stationary support located adjacent one of said surface portions; a braking member mounted on said support for movement between a braking position in engagement with one of said vehicle wheels, when the latter is on said one surface portion, and a releasing position out of engagement with said one vehicle wheel; a vertically movable member located adjacent the other of said surface portions; means mounting said vertically movable member for downward movement by the other of said vehicle wheels; and connecting means interconnecting said vertically movable member with said braking member for forcing the latter into said braking position thereof when said other vehicle wheel moves said vertically movable member downwardly.

3. Apparatus for braking a railroad car having a pair of spaced wheels located on spaced track portions, said apparatus comprising a stationary braking member mounted on one of said track portions on one side thereof so as to be located on one side of the one of said wheels on said one track portion; a lever pivotally mounted intermediate the ends thereof on said one track portion for movement about an axis parallel to the same; a movable braking member mounted on one end of said lever on the opposite side of said one track portion from said stationary braking member; and means associated with the end of said lever opposite said one end thereof for supporting the weight of a railroad car transmitted by the other of said wheels located on the other of said track portions, so that said movable braking member is urged toward said stationary braking member by said weight.

4. Apparatus as defined in claim 3 and wherein said means associated with said opposite end of said lever comprises an elongated operating member extending in the direction of said other track portion and means forming part of said other track portion for supporting said operating member for movement along the length of said other track portion, said operating member having an inclined edge portion adapted to contact said opposite end of said lever upon movement of said operating member so as to tilt said lever about said axis thereof.

5. Apparatus as defined in claim 4 and wherein said elongated operating member has a top surface portion located substantially at the same level as the top surface of said other track portion so as to be directly contacted by said other wheel of the railroad car.

6. An apparatus as defined in claim 4 and wherein said other track portion is vertically movable and said elongated operating member has a top surface located directly beneath and in contact with said other track portion.

7. Apparatus as defined in claim 3 and wherein said opposite end of said lever rotatably supports a roller.

8. Braking apparatus comprising, in combination, a pair of spaced supports; a pair of tracks respectively mounted on said supports; a lever pivotally mounted between opposite ends thereof on one of said supports for turning movement about an axis parallel to said tracks, said lever having one free end located adjacent said one support on one side of the track thereon and an opposite free end located adjacent the other of said supports; a stationary braking member mounted on said one support on the side of the track thereon opposite to said one free end of said lever; a movable braking member fixedly mounted on said one free end of said lever; a roller mounted on said opposite free end of said lever; and an elongated operating member mounted on the other of said supports for movement in a direction substantially parallel to the track thereon and having an inclined surface portion directed toward said roller for contacting the same upon shifting of said operating member in said direction so as to tilt said lever about said pivotal axis thereof.

9. Braking apparatus as defined in claim 8 and wherein said operating member has a top free surface located substantially at the level of the top surface of the track on the other of said supports so as to be engaged by a wheel of a car passing over the other of said supports.

10. Braking apparatus as defined in claim 8 and wherein the track on said other of said supports is mounted for vertical movement thereon and said elongated operating member has a top surface located directly beneath and in contact with said track on said other support.

References Cited in the file of this patent

UNITED STATES PATENTS

| 1,787,818 | Frölich | Jan. 6, 1931 |
| 1,812,691 | Frölich | June 30, 1931 |

FOREIGN PATENTS

| 483,361 | Germany | Jan. 18, 1931 |